July 22, 1958 — J. S. ALFORD — 2,844,001
FLOW STRAIGHTENING VANES FOR DIFFUSER PASSAGES
Filed Jan. 6, 1953
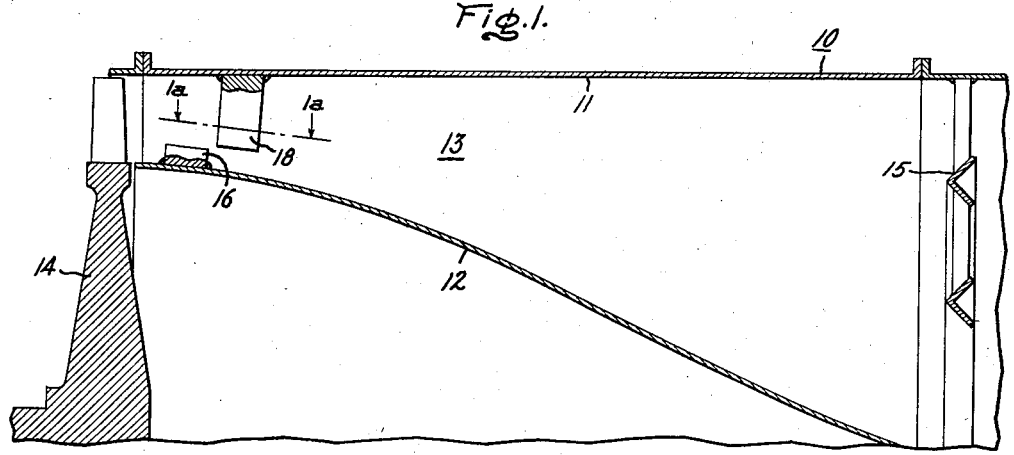
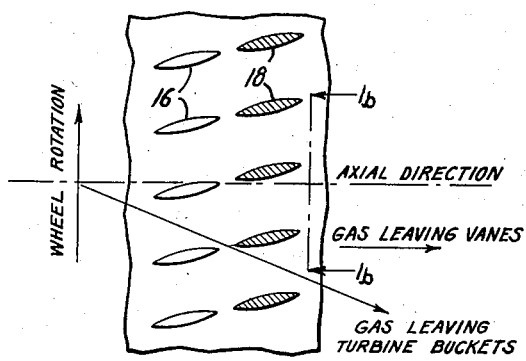
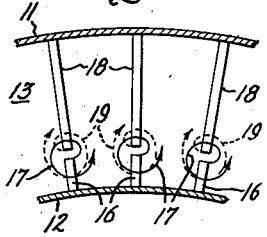
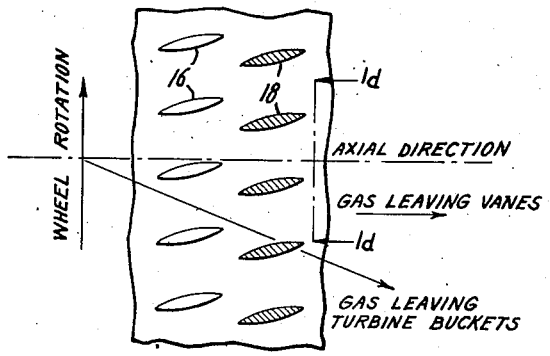
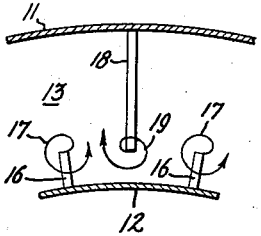
Inventor:
Joseph S. Alford,
by Richard E. Hasley
His Attorney.

July 22, 1958         J. S. ALFORD         2,844,001
FLOW STRAIGHTENING VANES FOR DIFFUSER PASSAGES
Filed Jan. 6, 1953         2 Sheets-Sheet 2
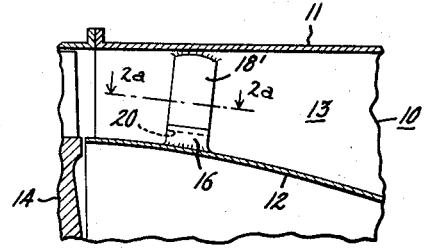
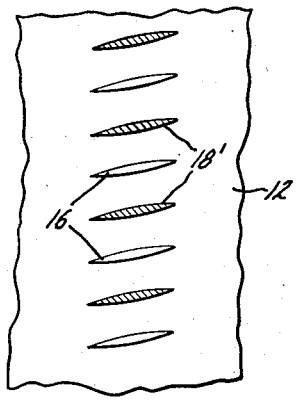
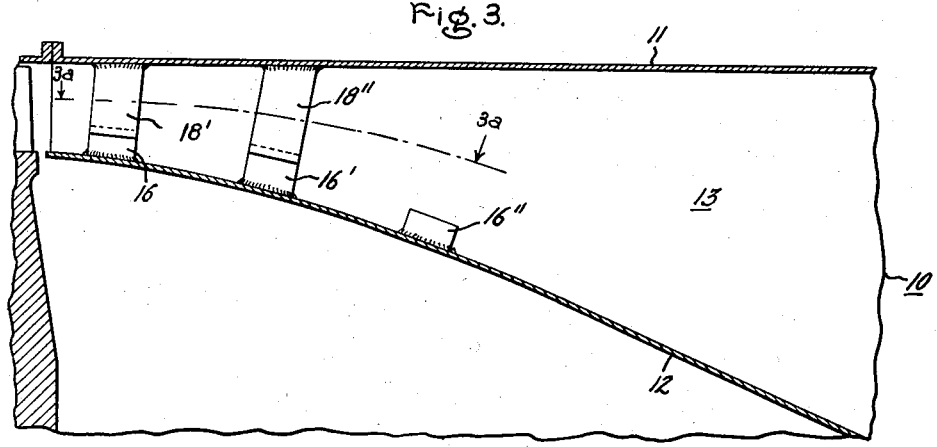
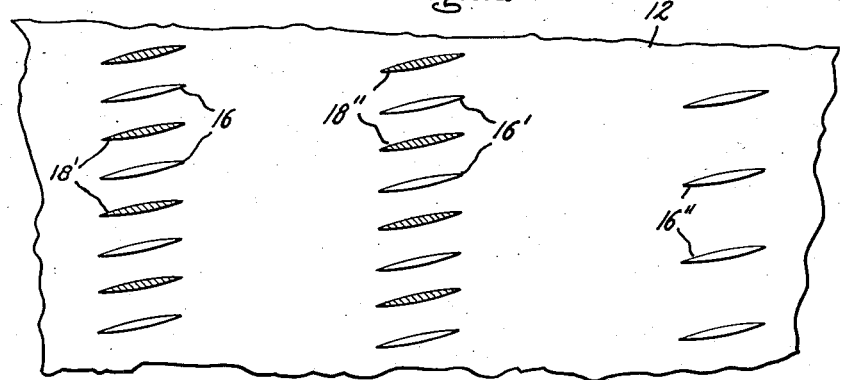
Inventor:
Joseph S. Alford,
by Richard E. Hasley
His Attorney.

United States Patent Office 2,844,001
Patented July 22, 1958

2,844,001

FLOW STRAIGHTENING VANES FOR DIFFUSER PASSAGES

Joseph S. Alford, Cincinnati, Ohio, assignor to General Electric Company, a corporation of New York Application January 6, 1953, Serial No. 329,859

11 Claims. (Cl. 60—35.6)

This invention relates generally to fluid flow and specifically to flow control in fluid conducting passages such as annular diffusers for use in afterburner structures of jet propulsion apparatus.

In the fluid flow leaving the buckets of a typical jet engine turbine, there is frequently present a swirl or tangential component of velocity caused by various factors, e. g. tip leakage over bucket ends, and by temperature and velocity stratifications in the fluid issuing from the combustion chamber. Also, variation in component efficiencies from engine to engine contribute to tangential velocity variations.

Elimination of the turbine exit swirl reduces the losses in the flow path downstream of the turbine exit: tangential velocity head of the discharged fluid being partially converted to axial total head to increase the total useful downstream fluid pressure, with the gases entering the afterburner chamber in an axial direction of a repeatable pattern, as compared with the widely varying flow patterns possible when substantial swirl is present. Therefore, the tangential velocity component is transferred into an axial velocity component so as to be transformed into useful work thereby adding to the total thrust produced.

In the field of fluid mechanics, it is well known that the velocity of a viscous fluid flowing over a contacting surface varies outwardly therefrom in accordance with certain situations and that due to viscosity and surface conditions, a layer of low velocity fluid forms adjacent the surface to form what is known as the boundary layer. The thickness of the boundary layer tends to increase with distance in the direction of fluid flow to the point where fluid deceleration at the zone of contact between the layers of fluid flowing at different velocities is no longer possible, producing a discontinuous flow between them, and a separation, dividing oncoming fluid flow from a region of reverse flow on the downstream side.

This separation is a source of instability, the backflow along the surface usually giving rise to eddies, which in turn lead to fully developed turbulence in the wake of boundary transition; and with the generation of eddies on a relatively large scale, the drain on the flow energy is greatly increased because of added flow resistance and dissipation of mechanical energy. But, when the boundary layer becomes turbulent, the lateral mixing of the turbulent fluid makes the velocity distribution more uniform and reduces the tendency toward separation, moving the point of separation downstream to improve overall fluid flow. Separation is sometimes completely prevented by drawing off the low velocity fluid through slots in the contacting surface.

Accordingly, it is an object of invention to provide means for reducing fluid losses in the flow path downstream of the turbine discharge.

Another object of invention is to increase the total useful pressure of the fluid downstream of the turbine exit by converting part of the tangential velocity head of the turbine discharge fluid into a static pressure rise.

Still another object of invention is to provide a means for repeating an axial flow pattern of turbine exhaust gases entering the afterburner structure of a jet propulsion apparatus.

An additional object of invention is to increase the efficiency of discharged fluid flow by delaying fluid separation in diffusing passages to a point further downstream.

A further object of invention is to combine a means for recovery of part of the energy represented by the tangential component of gas velocity leaving the turbine buckets with effective boundary layer control.

These and various other objects, features and advantages of the invention will be apparent from the following particular description and from an inspection of the accompanying drawings in which:

Fig. 1 is a schematic longitudinal cross section of a portion of the afterburner structure of a conventional jet propulsion apparatus;

Figure 1a is a partially developed enlarged view taken along the line 1a—1a of Fig. 1;

Fig. 1b is a viw taken along line 1b—1b of Figure 1a;

Fig. 1c is a partially developed enlarged view similar to the disclosure of Fig. 1a showing a modified structure thereof;

Fig. 1d is a view taken along line 1d—1d of Fig. 1c;

Fig. 2 is a partial longitudinal cross section showing a modification of the invention disclosed in Fig. 1;

Fig. 2a is a partially developed enlarged view taken along line 2a—2a of Fig. 2;

Fig. 3 is a schematic longitudinal cross section showing a further modification of the invention; and Fig. 3a is a partially developed enlarged view taken along line 3a—3a of Fig. 3.

The objects of the invention may be accomplished by the use of corotating vortex generators with straightening vanes in order to get the separate advantages of the use of each.

In the drawing, in which the same or like elements bear the same or similar numbers throughout the several figures, an afterburner structure of a conventional jet propulsion apparatus is disclosed generally at 10, comprising an outer duct wall 11 and an inner tailcone 12, appropriately supported therein and defining therewith an annular diffuser 13, which receives the fluid discharged from the blading carried by turbine rotor 14. Suitably shaped flame holders are installed at 15.

A plurality of stub vanes of airfoil cross section 16 are spaced equally on and substantially perpendicular to the tailcone 12, adjacent the exit from turbine rotor 14. These vanes are arranged with their chords at a predetermined angle to the flow of discharged fluid from the turbine so that due to the difference in pressures existing between the upstream and downstream surfaces of the vanes, corotating tip vortices are generated at the free ends of each of the vanes. These vortices are indicated as rotating counterclockwise at 17 in Fig. 1b and have their axes substantially parallel to the direction of fluid flow.

An identical number of straightening vanes 18, of airfoil section, project inwardly from outer duct wall 11 with their spans or longitudinal axes substantially parallel to those of the stub vanes 16. The straightening vanes extend in close proximity to the stub vanes but are spaced downstream therefrom with their chords aligned and at the same angle to the turbine fluid discharge, in order that the formation of corotating vortices is not hindered. These vanes 18 not only remove substantially all of the swirl or tangential component of velocity of the turbine exhaust gases, so that the gases leave in substantially an axial direction, but their free ends also generate corotating tip vortices, which when viewed as in Fig. 1b are rotating clockwise as at 19, the opposite of the tip vortices generated by stub vanes 16. The spacing between the ends of the vanes 16 and 18 is shown exaggerated in Fig. 1b but the functioning is similar whether they are spaced as shown or are on the same level or when in overlapping relationship.

By such an arrangement, two series of corotating tip vortices having opposite senses of rotation are formed adjacent each other and as disclosed, substantially close to the turbine exit, the positioning of the vortex generators being determined so that separation does not occur within specific limits. The counterrotation of the vortices results in a scouring effect on the tailcone surface downstream the vanes thereby preventing any substantial formation of a boundary layer because of the fluid mixing, so delaying the separation of the fluid to a point further downstream than it would normally form without the use of vanes or corotating vortex generators. In this way, not only is boundary layer control achieved by the gains from straightening the flow of the fluid passing between vanes 18 are also combined therewith. As is apparent in Fig. 1a, the angularity of stub vanes 16 and straightening vanes 18 is the same with respect to the direction of fluid flow.

Fig. 1c shows the manner in which the rows of vanes may be displaced circumferentially with respect to each other, the circumferential spacing and angularity to the fluid flow of the vanes in each row, and the axial displacement of the rows being the same as that disclosed in Figs. 1 and 1a, but with the ends of the vanes in overlapping relationship.

Fig. 1d shows the counterrotation of the tip vortices 17 and 19, formed by each series of vanes 16 and 18 disclosed in the arrangement of Fig. 1c, the scouring effect produced by the vane configuration of Fig. 1c differing from that produced by the configuration of Fig. 1a. By experiment, the optimum circumferential spacing between the vanes in each row has been determined as approximately equal to the chord dimension of the vanes.

Fig. 2 is a modification of the invention and is a variation of the structures disclosed in Figs. 1 and 1c. As previously disclosed, the stub vanes 16 project outwardly from tailcone 12, perpendicular thereto and equally spaced circumferentially thereon. The straightening vanes 18' are similar in configuration to vanes 18, Fig. 1, but extend between vanes 16 in a common row, as best shown in the partial developed cross section of Fig. 2a, so that the free ends of each row of vanes overlap, as disclosed at 20, Fig. 2, the circumferential spacing of the vanes in each row being approximately equal to the chord dimension of the vanes.

The series of corotating vortices produced by these ends are counterrotating with respect to each other as exemplified in Fig. 1d, the pressure differential between the upstream and downstream surfaces of the vanes still existing, the scouring effect due to the mixing by the vortices being different from that of the previously disclosed structures.

In Fig. 3, another modification shows the manner in which structures may be combined to prevent flow separation over a relatively long surface and to obtain effective boundary control of flowing fluid and straightened fluid flow where the dimensions of the flow passage are large. As in Fig. 1, the outer duct wall is shown at 11 with the tailcone at 12, defining the annular diffuser 13. Extending from the duct wall and tailcone respectively are an upstream series of equally spaced stub vanes 16 and straightening vanes 18' similar to the construction of Fig. 2, which serves to remove part of the swirl from the discharged turbine fluid. Conventional straightening vanes could also be used to partly straighten the fluid flow and could be shown either as extending perpendicular to the tailcone surface or parallel to the turbine rotor and be either straight or twisted airfoil sections, but the disclosed structure is preferable.

Downstream of stub and straightening vanes 16 and 18' is a similar row of circumferentially spaced stub vanes 16' and straightening vanes 18'', both of airfoil section. The stub vanes 16' are equally spaced around tailcone 12 and are angled in the same manner as the stub vanes 16, Fig. 2, but have longer spans to extend further into the stream of flowing fluid. Straightening vanes 18'' are similar to and spaced the same as straightening vanes 18', Fig. 2, with their free ends overlapping the free ends of stub vanes 16'. The counterrotating series of corotating vortices are generated by these two series of stub and straightening vanes in the manner disclosed in Fig. 1d to produce a scouring effect downstream. Because of the increased span of stub vanes 16', they also perform a straightening function but not to the extent that the longer straightening vanes 18'' do.

In order to move the separation point of the flowing fluid still further downstream, another series of stub vanes 16'' of airfoil section are used to generate corotating tip vortices. As disclosed in Fig. 3a, these vortices formed by stub vanes 16'' would rotate in the same direction as those formed by stub vanes 16 and 16' but they could be angularly displaced to form tip vortices rotating counter to those formed by stub vanes 16 and 16'.

Although a number of embodiments of the invention have been shown and described, it will be obvious to those skilled in the art that various structural changes are possible without departing from the scope of the invention as defined by the following claims; that the invention need not be confined to annular diffusers for afterburner structure but can be applied where the boundary layer problem exists; that it is intended that all matter contained in the preceding description or shown in the accompanying drawings shall be interpreted as illustrative and not limitative.

What is claimed is:

1. In a diffusing structure for a turbomachine, diverging wall surfaces defining an annular passage, in combination with corotating vortex generating and straightening means carried by said surfaces downstream of said turbomachine, said means comprising vanes extending from said surfaces toward each other, tips of opposing vanes terminating at approximately the same radial location in the annular passage adjacent at least one of said surfaces so that tip vortices of adjacent vanes from opposing surfaces provide boundary layer control.

2. In combination with divergent wall surfaces including a diffusing tailcone of a turbomachine, corotating vortex generating and straightening vanes carried by said surfaces downstream of said turbomachine, the vanes extending from said surfaces toward each other and partially transversely of said surfaces, the tips of opposing vanes terminating at approximately the same location and adjacent one of said surfaces whereby boundary layer control and recovery of kinetic energy of the tangential component of velocity of flowing fluid is achieved.

3. In a diffusing structure, a combination of a pair of divergent wall surfaces and means for generating corotating vortices comprising vanes having an airfoil section, said vanes being carried by said surfaces and extending toward each other, the tips of the opposing vanes terminating at approximately the same location adjacent one of said surfaces whereby fluid flow past said vanes is straightened by said vanes.

4. In a construction as set forth in claim 3, said vanes being of different heights and aligned in substantially parallel rows.

5. In a construction as set forth in claim 3, said vanes being aligned axially.

6. In a construction as set forth in claim 3, said vanes being spaced alternately in aligned parallel rows.

7. In combination with diverging surfaces defining an annular diffuser, corotating vortex generating means comprising vanes of airfoil section carried by said surfaces in parallel rows extending toward opposite wall surfaces, one of said rows of said vanes being substantially shorter than the other row of said vanes and displaced in an axial direction.

8. In a combination as set forth in claim 7, said vanes in said rows being displaced axially and circumferentially.

9. In a turbomachine, a diffusing tailcone structure comprising divergent surfaces, corotating vortex generating vanes mounted on said surfaces, said vanes extending toward each other in axially spaced rows, the heights of said vanes being such as to produce an overlap, said vanes carried by the inner of said surfaces being substantially shorter in height than said vanes carried by the outer surface, whereby said inner vanes serve substantially to generate a vortex and said outer vanes generate a corotating vortex and serve to straighten the flow of substantially all fluid flowing past said vanes.

10. In a turbomachine, an annular diffuser comprising divergent wall surfaces including a tailcone, vanes having an airfoil section carried by said surfaces and projecting toward each other, said vanes being equally spaced in rows, said rows being axially spaced with respect to each other, the spans of the vanes of said rows being unequal, whereby the rows of vanes having the shorter spans substantially solely generates corotating tip vortices and the row of vanes having the larger spans serves as corotating vortex generating and flow straightening means for substantially all of the flow past said vanes.

11. In an annular diffuser for a turbomachine, divergent wall surfaces defining said annular diffuser and carrying vanes having an airfoil section, said vanes being aligned equally in rows axially spaced with respect to each other, said vanes being disposed in angular relationship to the flow of fluid discharged into said diffuser whereby corotating tip vortices are formed, the vanes in one of said rows being shorter in span than the vanes in the other of said rows, the ends of said vanes in respective rows ending adjacent to each other, the ends of said vanes projecting into the fluid flow at approximately the boundary layer whereby said tip vortices prevent formation thereof by intermixture of discharged fluid.

References Cited in the file of this patent

UNITED STATES PATENTS

| | | |
|---|---|---|
| 1,697,770 | Kreikenbohm | Jan. 1, 1929 |
| 2,006,805 | Gwinn | July 2, 1935 |
| 2,041,793 | Stalker | May 26, 1936 |
| 2,183,561 | Hamblin | Dec. 19, 1939 |
| 2,558,816 | Bruynes | July 3, 1951 |
| 2,573,834 | Davidson | Nov. 6, 1951 |
| 2,650,752 | Hoadley | Sept. 1, 1953 |